United States Patent [19]
Fujita

[11] Patent Number: 5,754,527
[45] Date of Patent: May 19, 1998

[54] LINE SWITCHING APPARATUS

[75] Inventor: Yoshitaka Fujita, Tokyo, Japan

[73] Assignee: NEC Corporation, Tokyo, Japan

[21] Appl. No.: 619,792

[22] Filed: Mar. 20, 1996

[30]  Foreign Application Priority Data

Mar. 20, 1995 [JP] Japan ................................. 7-060344

[51] Int. Cl.$^6$ ..................................................... H04L 1/22
[52] U.S. Cl. ........................ 370/217; 370/219; 370/228
[58] Field of Search ................................. 370/216–220, 370/225–228, 395; 395/182.02, 183.19, 184.01

[56]  References Cited

U.S. PATENT DOCUMENTS 5,465,348  11/1995  Amemiya et al. .................. 395/182.02
5,488,606  1/1996  Kakuma et al. ......................... 370/219

OTHER PUBLICATIONS

Anderson et al., "Fast Restoration of ATM Networks", IEEE Journal on Selected Areas in Communications, vol. 12, No.1, pp. 128–138, (1994).
"STM–N Protection Switching", CCITT G. 782, pp.15–17 (undated).

Primary Examiner—Melvin Marcelo
Attorney, Agent, or Firm—Foley & Lardner

[57]  ABSTRACT

A line switching apparatus is applied to a system which has a current system line and a spare system line, transmits identical ATM cell streams via the two lines, and adds protection switching cells to the ATM cell streams on a transmission side when line quality of the current system line deteriorates. The apparatus is adapted to switch a line to be used from the current system line to the spare system line in the system. The apparatus includes a first VPI converter, a multiplexer, a spare system line information read section, and a second VPI converter. The first VPI converter converts the VPI of the spare system line into a VPI different from the VPI of the current system line. The multiplexer detects a phase shift amount between the current and spare system lines on the basis of positions of the protection switching cells on the two lines, corrects the phase shift amount, and performs multiplexing processing of packing the cell stream on the spare system line, whose VPI has been converted, at empty cell positions of the cell stream on the current system line. The read section reads out the information of the spare system line from the multiplexed cell stream. The second VPI converter converts the readout cell stream on the spare system line into the initial VPI.

4 Claims, 8 Drawing Sheets

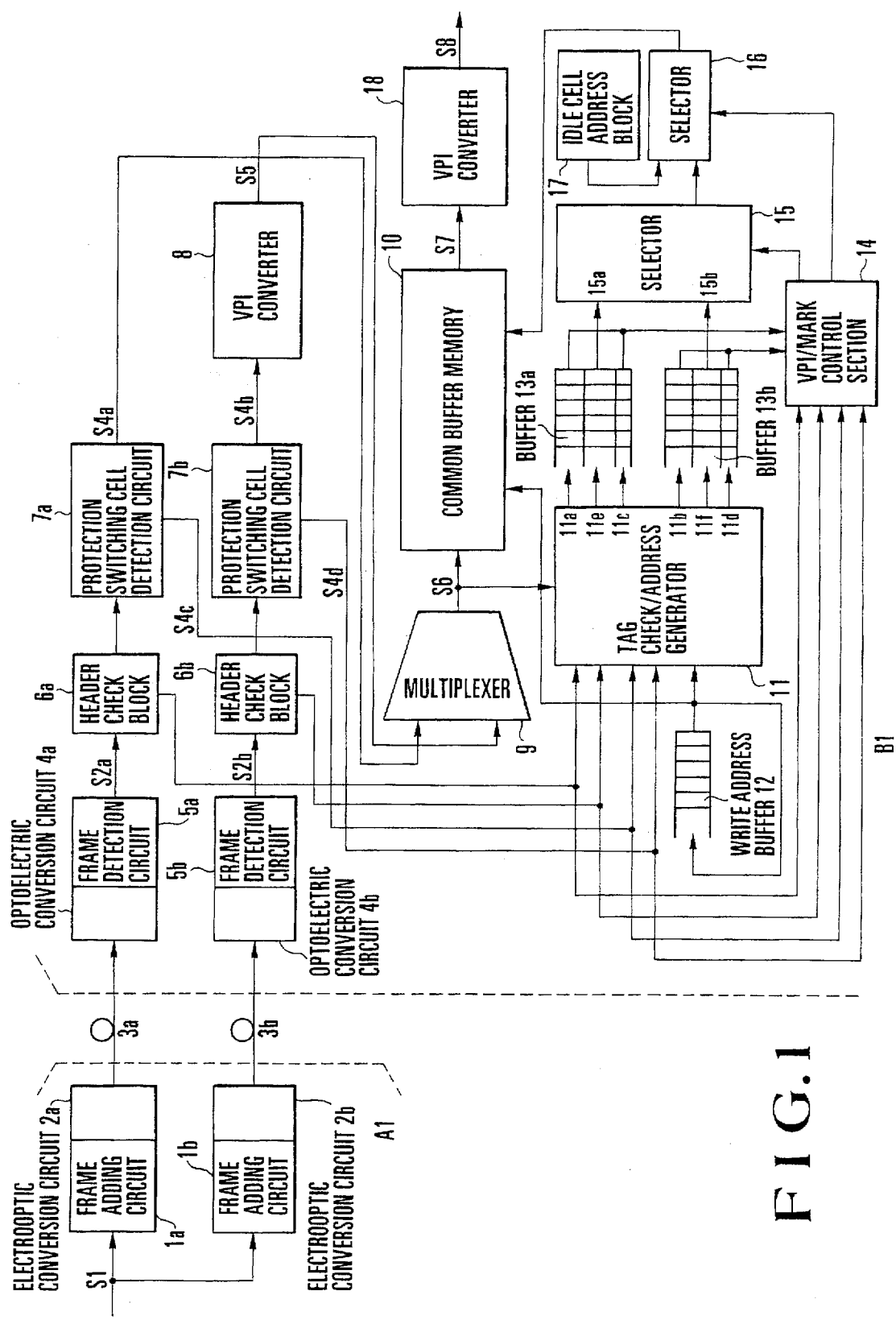
F I G. 1

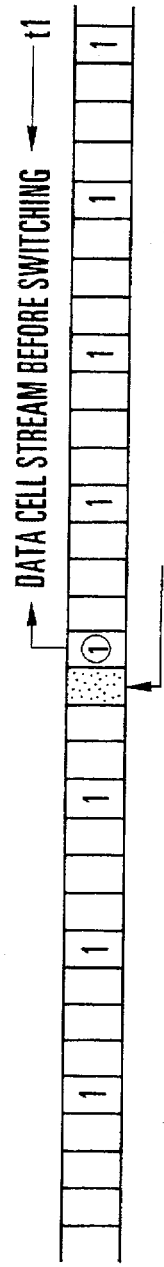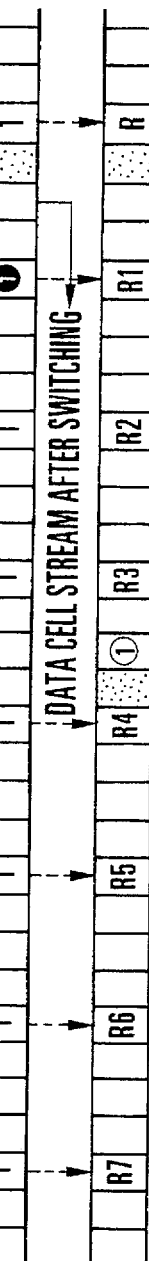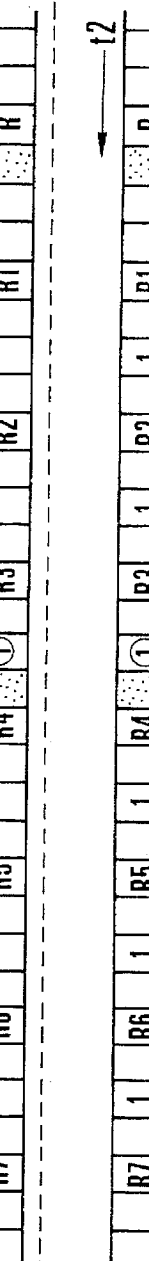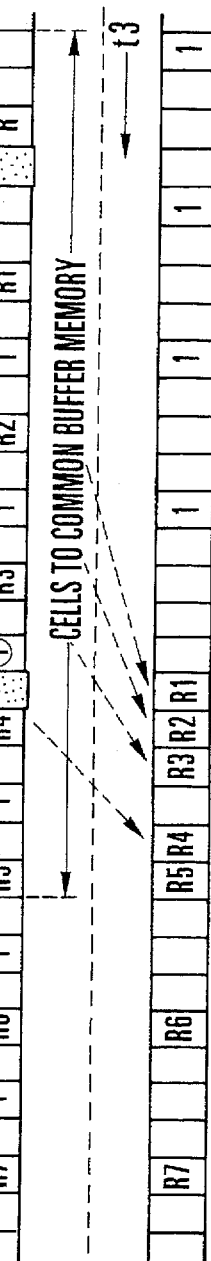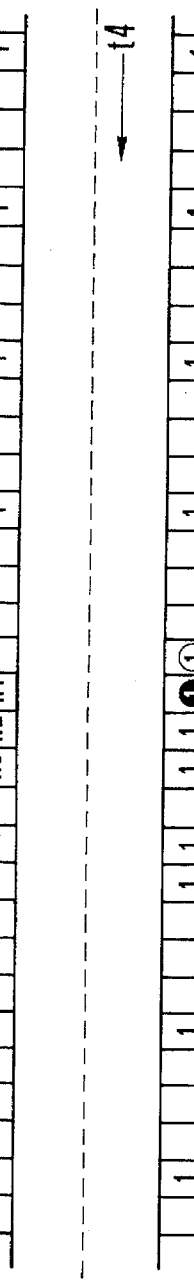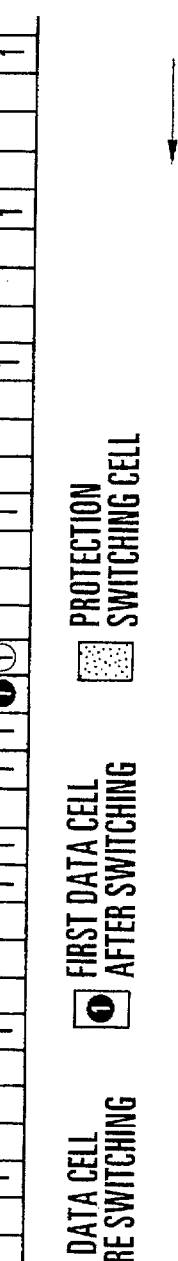

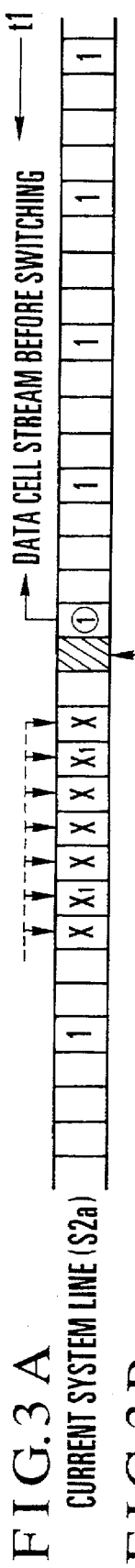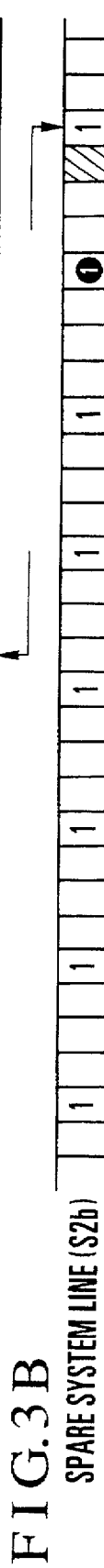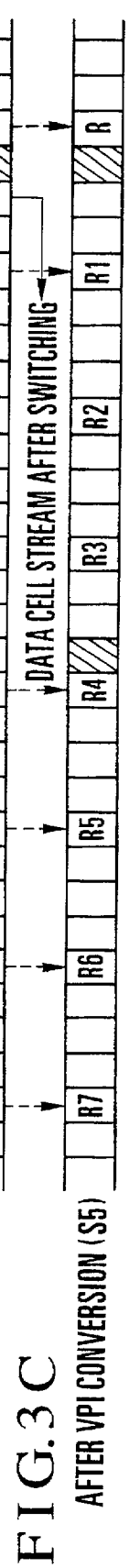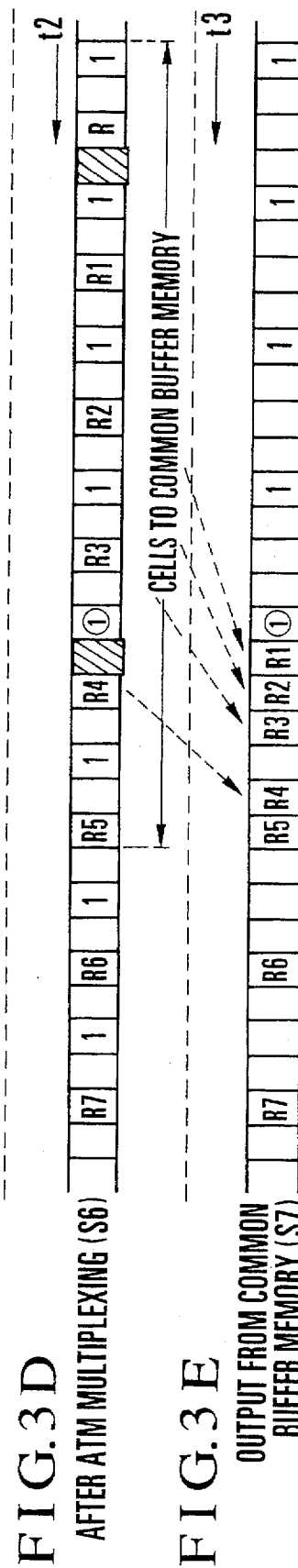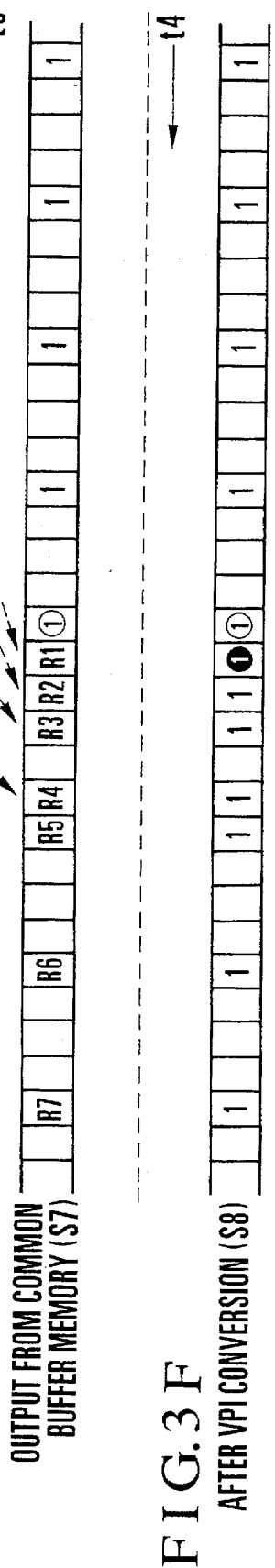

LINE SWITCHING APPARATUS

BACKGROUND OF THE INVENTION

The present invention relates to a line switching apparatus for switching from a current system transmission path to a spare system transmission path in a transmission network to transfer ATM (Asynchronous Transfer Mode) cells by using, e.g., a SONET (Synchronous Optical Network) frame as a physical medium.

Conventionally, switching from a current system transmission path to a spare system transmission path is performed in a transmission network using a SONET frame.

FIG. 5 shows such a conventional line switching apparatus. Two systems are connected to each other via a current system transmission path 301 and a spare system transmission path 302 to constitute a duplex system.

A transmission interface A1 of the apparatus transmits SONET frames consisting of the same data contents to a reception interface B1 on the distant station side via the current system transmission path 301 and the spare system transmission path 302. In switching transmission paths, a selector 701 of the reception interface B1 selects information 601 from the current system transmission path 301 and information 602 from the spare system transmission path 302 to perform switching from the current system transmission path 301 to the spare system transmission path 302, thereby obtaining an output signal 801 upon switching.

Reference numerals 101 and 102 denote frame adding circuits for adding frames (including pointer values) to payload signals; 201 and 202, electrooptic conversion circuits 201 and 202 for converting electrical signals into optical signals; 401 and 402, optoelectric conversion circuits 401 and 402 for converting optical signals into electrical signals; and 501 and 502, frame detection circuits for detecting frame signals (including pointer values) and recognizing termination.

The above scheme is a 1+1 line switching scheme. FIG. 6 shows 1:N line switching scheme having N current system transmission paths and one spare system transmission path.

The arrangement in FIG. 6 is the same as that in FIG. 5 except that the current system transmission paths correspond in number to N systems. A selector 00P selects one of N current system signals 001 to 00N on a transmission interface A1, and sends the selected signal to a spare system transmission path 30P. Selectors 701 to 70N of a reception interface B1 respectively select current system signals 601 to 60N and a spare system signal 60P.

Assume that a failure has occurred in the current system transmission path 301, and the reception interface B1 is to perform switching to the spare system transmission path 30P. Assume also that transmission signals from the reception interface B1 to the transmission interface A1 consist of identical blocks. In this case, the optoelectric conversion circuit 401 or the frame detection circuit 501 on the reception interface B1 detects an input failure, and the reception interface B1 notifies the frame adding circuit 1a of the corresponding information via transmission paths (the current system transmission path and the spare system transmission path).

Upon reception of the notification, the transmission interface A1 recognizes a specific current system transmission path in which the failure has occurred, and controls the selector 00P to perform switching from the current system transmission path, in which the failure is considered to have occurred, to the spare system transmission path. The spare system signal 60P on the reception interface B1 has the same contents as those of the input signal 001, and the selector 701 switches the signal 601, which has caused the failure, to the output signal 60P. When a signal 801 obtained upon switching is output, the switching operation is completed, and restoration from the failure state is attained.

Note that this switching scheme is specified in G782 and G783 of CCITT.

In such a conventional scheme, since the entire current system transmission path extending from the transmission side to the reception side is switched to the spare system transmission path, a short transmission interruption of data occurs.

In the 1:N line switching scheme, while one current system transmission path is switched to the spare system transmission path upon occurrence of a failure in the current system transmission path, even if a new failure occurs in another current system transmission path, this current system transmission path cannot be switched to the spare system transmission path.

Conventionally, in monitoring the line quality of a transmission path, a SONET·STS-3C frame like the one shown in FIG. 7 is used. In this frame, only a byte B1 (Bit Interleaved Parity 8-code operation: BIP-8) and a byte B2 (BIP-24) constitute information for monitoring line quality at a period of 125 μs. It is reported ("Fast Restoration of ATM Networks", IEEE Journal on Selected Areas in Communications, Vol. 12, No. 1, January, 1994), that it takes 100 ms to detect an error rate of $10^{-6}$ to $10^{-7}$ by detecting 100 errors. Consequently, it takes two seconds to detect an error rate of $10^{-4}$ to $10^5$ by detecting 15,310 errors. It is also reported that an error rate of $10^{-3}$ to $10^{-4}$ or more cannot be detected.

As described above, in the conventional line switching apparatuses, it takes much time to monitor line quality. In addition, a long period of time is required to perform switching from a current system transmission path to a spare system transmission path.

FIG. 8 shows the known structure of an ATM cell.

SUMMARY OF THE INVENTION

The present invention has been made in consideration of the above situation, and has as its object to perform line switching without causing any short transmission interruption of data, cope with a multiplex failure in a current system transmission path even when 1:N line switching is performed, and quickly monitor line quality even at a low error rate so as to allow switching in a short period of time.

In order to achieve the above object, according to the present invention, there is provided a line switching apparatus applied to a system which has a current system line and a spare system line, transmits identical ATM cell streams via the two lines, and adds protection switching cells to the ATM cell streams on a transmission side when line quality of the current system line deteriorates, the apparatus being adapted to switch a line to be used from the current system line to the spare system line in the system, comprising a first VPI converter for converting a VPI of the spare system line into a VPI different from a VPI of the current system line, a multiplexer for detecting a phase shift amount between the current and spare system lines on the basis of positions of the protection switching cells on the two lines, correcting the phase shift amount, and performing multiplexing processing of packing the cell stream on the spare system line, whose VPI has been converted, at empty cell positions of the cell stream on the current system line, spare system line information read means for reading out information of the spare system line from the multiplexed cell stream, and a second VPI converter for converting the readout cell stream on the spare system line into the initial VPI.

ATM cell multiplexing of ATM cell streams on the current and spare system lines is performed, and the resultant ATM cell stream is written in the buffer memory having a capacity large enough to absorb the phase difference between the ATM cell streams on the current and spare system lines. The above phase difference does not change so frequently. If, therefore, the phase difference is counted in advance before a failure or a line deterioration occurs, and read addresses for the buffer memory are controlled, switching of a virtual path VP as a unit in an ATM cell stream can be attained without any omission and redundancy of cells and any short transmission interruption.

Since line quality is monitored by counting HEC byte errors in the respective ATM cells, the line quality can be quickly checked. In addition, since switching is also performed by controlling read addresses, the total time required for switching is short.

BRIEF DESCRIPTION OF THE DRAWINGS

FIG. 1 is a block diagram showing the arrangement of an embodiment of the present invention;

FIG. 2A to 2F are timing charts for explaining the operation of the apparatus in FIG. 1;

FIGS. 3A to 3F are timing charts showing the operation of the apparatus in FIG. 1 in a different state;

DESCRIPTION OF THE PREFERRED EMBODIMENTS

Figure 4:
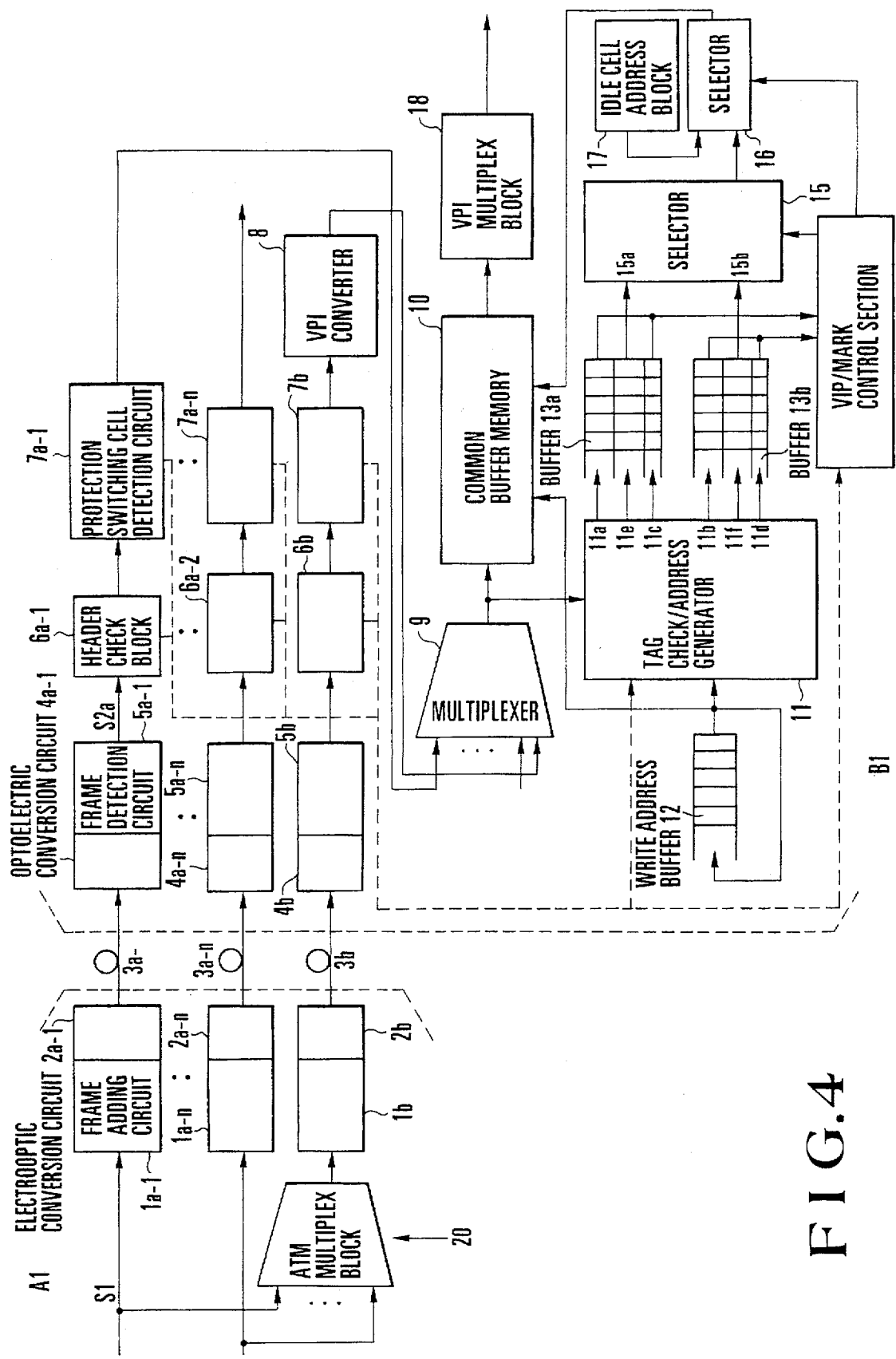
FIG. 4 is a block diagram showing the arrangement of another embodiment of the present invention.
Figure 5:
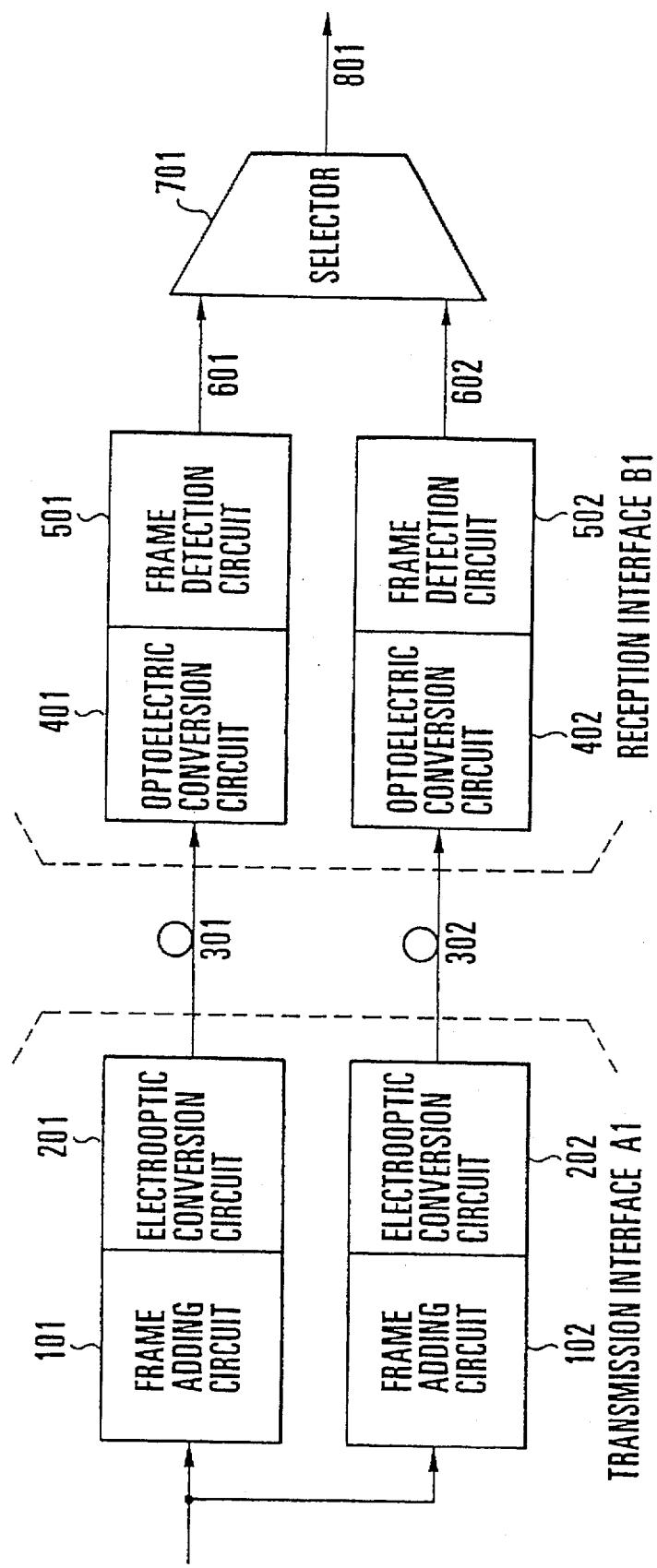
FIG. 5 is a block diagram showing the arrangement of a conventional apparatus.
Figure 6:
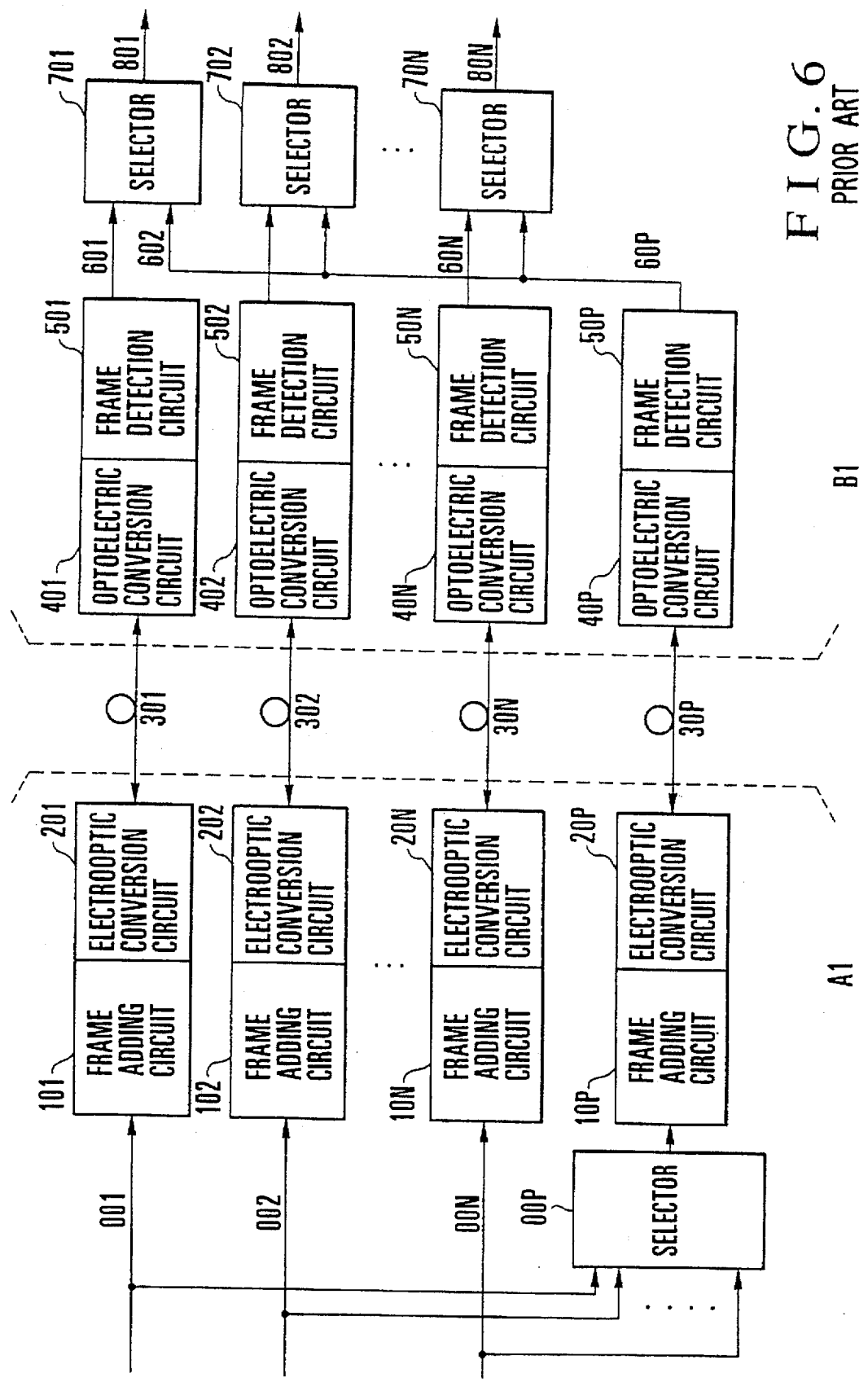
FIG. 6 is a block diagram showing another conventional apparatus.
Figure 7:
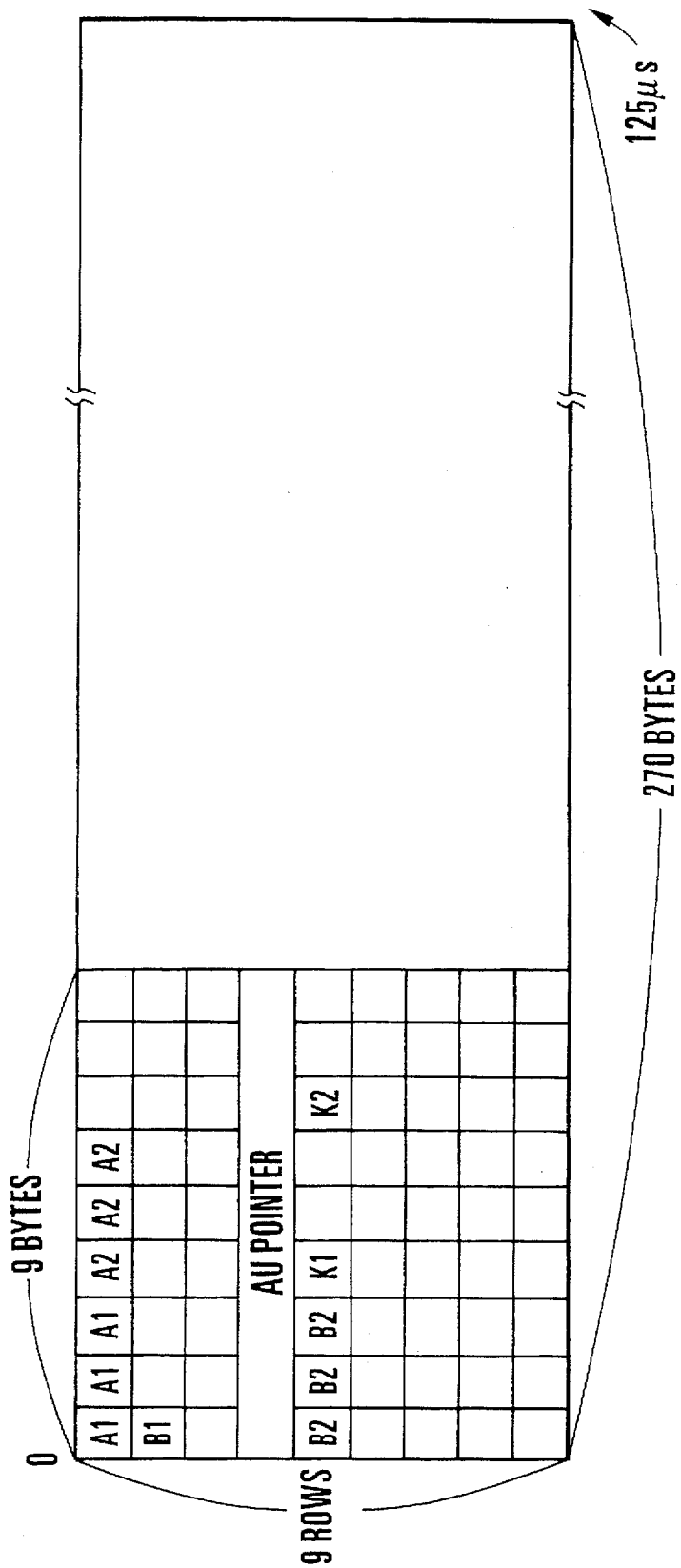
FIG. 7 is a view showing a SONET (STS-3C) frame.
Figure 8:
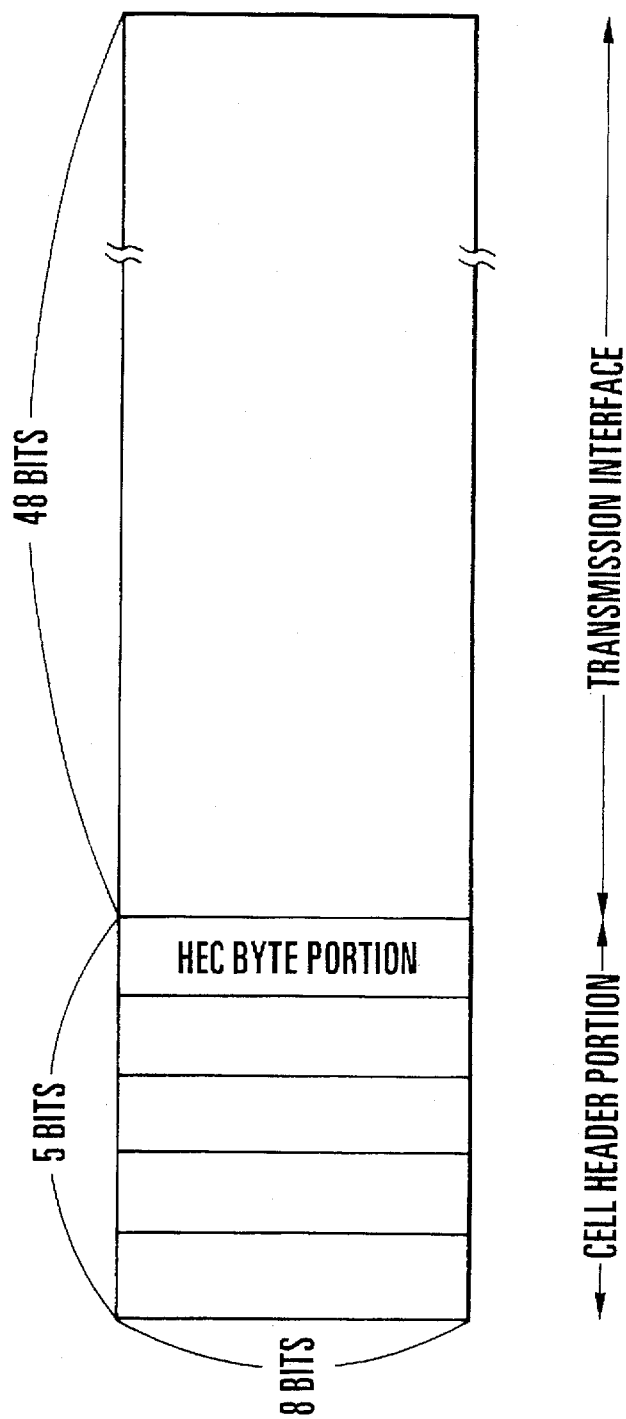
FIG. 8 is a view showing an ATM cell structure.

FIG. 1 shows a line switching apparatus according to an embodiment of the present invention. This apparatus is constituted by one current system line and one spare system line.

A payload signal S1 incorporating an ATM cell is simultaneously supplied to frame adding circuits 1a and 1b. In each circuit, a frame containing a pointer is added to the payload signal S1. The signals to which the frames are added are converted into optical signals by electrooptic conversion circuits 2a and 2b and output to current and spare system lines 3a and 3b, respectively. Each of the signals output to the current and spare system lines 3a and 3b is a signal in which an ATM cell is mapped according to a predetermined standard (e.g., SONET STS-3C frame).

The optical signals transmitted via the current and spare system lines 3a and 3b are converted into electrical signals by optoelectric conversion circuits 4a and 4b. The signals are then converted into frame signals containing pointer values by frame detection circuits 5a and 5b. As a result, pieces of SOH (Section Over Head) information are processed, and the transmission clocks are converted into clocks for a reception interface B1 to be output as pure ATM cell streams S2a and S2b.

Header check blocks 6a and 6b always monitor the HEC bytes of the header portions of the ATM cells, and count error rates or detect HEC byte errors.

Assume that one virtual path of the current system line 3a is switched to the spare system line 3b. In this system, identical ATM cell streams are transmitted to the current and spare system lines. When the data line quality deteriorates, protection switching cells are added to ATM cell streams on the transmission side.

FIGS. 2A to 2F are timing charts showing this switching operation. An ATM cell stream S2a on the current system line in FIG. 2A is slightly different from an ATM cell stream S2b on the spare system line in FIG. 2B. Assume that the phase of the ATM cell stream S2b advances with respect to the phase of the ATM cell stream S2a. Referring to FIGS. 2A to 2F, the time flows from right to left. In addition, each cell indicated by the number 1 in a white circle is a last data cell before switching; each cell indicated by the number 1 in a black circle, a first data cell after switching; each crosshatched square cell, a protection switching cell; and each cell indicated by a blank frame, an empty cell. Times have the following relationship: t1<t2<t3<t4.

The two signals of the ATM cell streams S2a and S2b have the same contents, and protection switching cells serving as triggers for causing switching are detected by protection switching cell detection circuits 7a and 7b in FIG. 1. In the ATM cell stream S2a, cells immediately before the switching cell indicated by the number 1 in the white circle constitute an ATM cell stream immediately before switching. In the ATM cell stream S2b, cells immediately after the switching cell indicated by the number 1 in the black circuit constitute an ATM cell stream after switching.

In this case, the cells in which numbers are written are effective cells, but the cells in which no numbers are written are empty cells. Each number represents a VPI value. For the sake of simplicity, assume that one virtual path having a VPI value of "1" is present in each of the ATM cell streams S2a and S2b.

When the protection switching cell detection circuits 7a and 7b detect the protection switching cells indicated by the crosshatched squares, ATM cell streams S4a and S4b are output, and the VPI value of the ATM cell stream S4b on the spare system line 3b is regularly changed by a VPI converter 8.

Assume that the VPI value has a sufficient margin, and hence does not overlap the VPI value of the cell stream S4a on the current system line even with the above change. The ATM cell stream S4b whose VPI value has been changed is output as an ATM cell stream S5, as shown in FIG. 2C. Referring to FIG. 2C, the VPI values of cells R, R1, R2, . . . , R7 are the same value which is not "1". A multiplexer 9 performs ATM cell multiplexing of the ATM cell streams S4a and S5.

In this ATM cell multiplexing, while the bit rate of the cell stream on the tributary side remains the same as that of a cell stream after cell multiplexing, effective cells are packed into empty cells found in the tributary cell stream, thereby performing multiplexing.

When the multiplexer 9 performs ATM cell multiplexing of the ATM cell streams S4a and S5, an ATM cell stream S6 in FIG. 2D is obtained. This stream is output to a common buffer memory 10 and a tag check/address generator 11.

The tag check/address generator 11 receives protection switching cell detection signals S4c and S4d from the protection switching cell detection circuits 7a and 7b, and always monitor to determine a specific virtual path in the line on a specific side as a path to be switched. In addition, the tag check/address generator 11 always stores and updates the number of cells corresponding to the phase difference between the two lines in accordance with the protection switching cell detection signals S4c and S4d.

The tag check/address generator 11 checks write addresses for the common buffer memory 10 which are sequentially generated by a write address buffer 12, and outputs VPIs for the current and spare system lines from VPI output terminals 11a and 11b. The tag check/address generator 11 outputs pieces of mark information respectively indicating specific cells, i.e., from the start cells to the last cells, to be read out from the current system line and the spare system line from address signal output terminals 11e and 11f. The output signals from the output terminals 11a, 11c, and 11e of these output terminals are supplied to a current system buffer 13a. The output signals from the output terminals 11b, 11d, and 11f are supplied to the spare system buffer 13b.

The sum of cells stored in the buffers 13a and 13b is equal to the total number of cells stored in the common buffer memory 10. The buffers 13a and 13b output VPI values and pieces of mark information to a VPI/mark control section 14, and pieces of address information to a selector 15.

The VPI/mark control section 14 receives the VPI values and the pieces of mark information to determine a specific virtual path to be switched from the current system line to the spare system line at a specific cell. The determination result is output to the selector 15.

The selector 15 selects either an address signal to be supplied to a terminal 15a as an address signal for the current system line or an address signal to be supplied to a terminal 15b as an address signal for the spare system line for each virtual path in accordance with the received output signal from the VPI/mark control section 14, and outputs the selected signal to a selector 16 on the next stage. In this case, for the sake of simplicity, only VPI=1 is assumed. For this reason, such an operation is performed.

When the effective cell density in an ATM cell stream is very low, or cell flow rate adjustment is to be performed, the cell format of an empty cell is stored at a predetermined address in the common buffer memory 10 in advance. The selector 16 reads out the address information from an idle cell address block 17 to control the empty cell density in an ATM cell stream S7 read out from the common buffer memory 10.

In a normal operation, address information from the selector 15 is selected and used a read address for the common buffer memory 10. For example, cells within the range indicated by the arrows in FIG. 2D are used as signals which have passed through the common buffer memory 10, as shown in FIG. 2E.

In this case, a VPI converter 18 restores the VPI value converted by the VPI converter 8 to the initial value, and outputs it as a signal S8 in FIG. 2F.

A line switching operation which is not performed in accordance with a protection switching cell but is performed upon occurrence of a failure in the current system line will be described next.

Assume that signal abnormalities have occurred on the current system line (seven HEC abnormalities (such as errors) have occurred consecutively in this case), as shown in FIG. 3A. The header check blocks 6a and 6b in FIG. 1 always monitor HEC abnormalities, and output the monitoring results to the tag check/address generator 11 and the VPI/mark control section 14.

In the VPI/mark control section 14, since the phase difference between the current system line and the spare system line is known, specific cells as the start points of switching are known. In this case, the hatched cells in cell streams S2a and S2b on the current and spare system lines are known as start points. Pieces of mark information are output from the terminals 11c and 11d of the tag check/address generator 11 on the basis of the start points.

The VPI/mark control section 14 switches an address for the current system to an address for the spare system upon determining whether this switching operation is performed in accordance with a protection switching cell or owing to a line abnormality.

Other operations, i.e., operations associated with the signal in FIG. 3C which is obtained by the VPI converter 8 upon VPI conversion, the signal in FIG. 3D which is obtained by the multiplexer 9 upon multiplexing, the signal in FIG. 3E which have passed through the common buffer memory 10, and the signal in FIG. 3F which is obtained by signal processing after VPI conversion performed by the VPI converter 18, are the same as those in the case shown in FIG. 2 in which switching is performed in accordance with protection switching cells.

The 1:N line switching scheme having a plurality of current system transmission paths and one spare system transmission path will be described next.

FIG. 4 shows the arrangement of a line switching apparatus according to another embodiment of the present invention, which includes N ("n" in FIG. 4) current system transmission paths and one spare system transmission path.

When a virtual path in a plurality of current system transmission paths is to be switched to the spare system by using protection switching cells, a selective ATM multiplex block 20 of a transmission interface A1 performs ATM cell multiplexing up to the output stream capacity, and transmits the resultant output to the spare system transmission path. In the reception interface B1, similar to the case of the 1+1 scheme described with reference to FIG. 1, a cell stream read out from a common buffer memory 10 can be controlled, and a switching operation can be performed.

When failures occur in a plurality of paths of the N current system transmission paths, switching of virtual paths can be performed within the spare system transmission path capacity in accordance with the degrees of importance of virtual paths in the transmission paths. With this operation, line restoration can be performed. In this case, however, ATM cell streams on the current system lines of the ATM streams in which the failures have occurred are read out without any change, and only the ATM cell stream transmitted via the spare system transmission path must be restored to the initial VPI.

The above description will be summarized as follows.

In a line switching apparatus for performing switching from a current system line to a spare system line upon occurrence of a failure, information to be transmitted is informed obtained by mapping ATM cells in payloads in a SONET STS-3C frame.

This apparatus has circuits represented by header check blocks 6a and 6b which always check HEC bytes by detecting the header portions of ATM cells in the two system lines, detect a line abnormality by monitoring the quality state of each system line, or detect an error rate higher than a specified rate, and output the detection result.

This apparatus includes a circuit represented by a protection switching cell detection circuit 7a which detects a protection switching cell serving as a trigger for causing to switch a virtual path independently from the current system line to the spare system line or from the spare system line to the current system line.

The apparatus includes a VPI converter 8 for regularly converting a VPI value in the spare system line to an unused VPI value to allow identification of the values even if the VPI value in the current system line is identical to the VPI value in the spare system line.

The apparatus includes a multiplexer 9 for outputting an ATM cell stream obtained by cell multiplexing of an ATM cell stream in the current system line and a cell stream in the spare system line.

The apparatus includes a buffer memory 10 storing outputs from the multiplexer 9 and having a capacity large enough to absorb a phase difference. Write addresses for the buffer memory 10 are sequentially and regularly input from a write buffer memory 12.

The apparatus includes buffers 13a and 13b which output the VPI values of the respective cells in the current system line and the spare system line, together with the corresponding addresses, on the basis of the ATM cell stream having undergone cell multiplexing in the multiplexer 9 and the write addresses generated by the write address buffer 12, and store an address value difference representing the phase difference between the two lines.

The apparatus includes a VPI/mark control section 14 for outputting mark information as a mark indicating a specific cell as a boundary in performing switching from the current system to the spare system or from the spare system to the current system.

The apparatus includes a selector 15 for selecting the address values of cells sequentially output in the current and spare systems through the VPI/mark control section 14.

With this arrangement, a cell stream is read out from the common buffer memory 10, i.e., switching from the current system to the spare system or from the spare system to the current system is performed without any short transmission interruption. Although the VPI values are converted into different values, an ATM cell stream generated on the transmission side is read out without any omission.

The apparatus includes a VPI converter 18 for restoring the VPI values which are regularly converted to the initial VPI values in accordance with the corresponding rule, and outputting an ATM cell stream. With this arrangement, switching of a virtual path as a unit from the current system to the spare system or from the spare system to the current system can be performed at a high speed without any short transmission interruption.

As has been described above, according to the present invention, when the line quality of a current system line deteriorates, protection switching cells are added to signals which are transmitted via the current and spare system lines. The phase difference between the current and spare system lines is detected from the positions of the protection switching cells, and the VPI of the ATM cell stream on the spare system line is converted so as not to be mistaken for the VPI of the cell stream on the current system line. Thereafter, cell multiplexing of the cell stream for the spare system line and the ATM cell stream for the current system line is performed in consideration of the phase difference between the current and spare system lines, and the ATM cell stream for the spare system line is read out. The VPI of the readout ATM cell stream is converted into the initial VPI. With this operation, by switching cell read addresses, either the current system line or the spare system line can be selected. Since a cell to be read can be designated by changing the address, no short transmission interruption is caused by a switching operation.

In addition, in the present invention, since line quality can be determined by monitoring HEC bytes, a detecting operation can be performed in a short period of time as compared with the prior art in which the line quality is monitored by using a SONET frame. In the prior art, it takes several seconds to detect an error rate of about $10^{-4}$. In the present invention, however, it takes about several ms to detect the same error rate. Therefore, line quality can be quickly determined.

Furthermore, according to the present invention, ATM cell streams corresponding to a plurality of current system lines can be transmitted by multiplexing a cell stream on the spare system line as well. Even if, therefore, the spare system line is in use, when the line quality of another current system line deteriorates, the current system line can be switched to the spare system line as long as the line capacity allows it.

What is claimed is:

1. A line switching apparatus applied to a system which has a current system line and a spare system line, transmits identical ATM cell streams via said two lines, and adds protection switching cells to the ATM cell streams on a transmission side when line quality of the current system line deteriorates, said apparatus being adapted to switch a line to be used from the current system line to the spare system line in said system, comprising:

a first VPI converter for converting a VPI of the spare system line into a VPI different from a VPI of the current system line;

a multiplexer for detecting a phase shift amount between the current and spare system lines on the basis of positions of the protection switching cells on said two lines, correcting the phase shift amount, and performing multiplexing processing of packing the cell stream on the spare system line, whose VPI has been converted, at empty cell positions of the cell stream on the current system line;

spare system line information read means for reading out information of the spare system line from the multiplexed cell stream; and a second VPI converter for converting the readout cell stream on the spare system line into the initial VPI.

2. An apparatus according to claim 1, wherein the line quality is monitored by monitoring an HEC byte in an ATM stream.

3. A line switching apparatus applied to a system which has a plurality of current system lines and one spare system line and transmits, when line quality of a current system line deteriorates, an ATM cell stream identical to an ATM cell stream on the current system line whose line quality has deteriorated via the spare system line, said apparatus being adapted to switch a line to be used from a current system line to the spare system line in said system, comprising:

a first multiplexer for multiplexing the ATM stream on the current system line whose line quality has deteriorated via the spare system line;

a first VPI converter for converting a VPI in the cell stream multiplexed by said first multiplexer into a VPI which can be discriminated from a VPI of the current system line;

a second multiplexer for performing cell multiplexing of the cell streams on the current and spare system lines; and a second VPI converter for reading out a cell stream on a current system line whose line quality has not deteriorated, of the cell streams multiplexed by said second multiplexer, without any change, and converting the VPI of the readout cell stream on the spare system line into the initial VPI.

4. A line switching apparatus for switching a line to be used from a current system line to a spare system line when a failure occurs in the current system line while ATM cell streams are transmitted to both the current and spare system lines, comprising:

a header check block for always checking an HEC byte of a header portion of each ATM cell stream, and outputting a detection result upon detection of a line abnormality or an error rate not lower than a specified rate;

a protection switching cell detection circuit for detecting a protection switching cell serving as a trigger for causing switching from the current system line to the spare system line or from the spare system line to the current system line;

a first VPI converter for regularly converting a VPI value of the spare system line into an unused VPI value;

a multiplexing circuit for performing ATM cell multiplexing of the ATM cell streams on the current and spare system lines, and outputting the cell-multiplexed ATM stream;

a common buffer memory storing an output from said multiplexing circuit and having a capacity large enough to absorb a phase difference between the ATM cell streams on the current and spare system lines;

a write address buffer for regularly generating a write address for said common buffer memory;

a tag check/address generating section for receiving an output from said header check block, an output from said protection switching cell detection circuit, the ATM cell stream cell-multiplexed by said multiplexing circuit, and the write address generated by said write address buffer, and outputting a VPI value of each cell on each of the current and spare system lines, address information corresponding to each cell, and mark information indicating a cell to be read out;

a buffer for receiving an output from said tag check/ address generating section, and storing an address value difference representing a phase difference between the two lines;

a VPI/mark control section for receiving the VPI values and the mark information from said tag check/address generating section, and outputting mark information as a mark indicating a specific cell from which switching is to be performed from the current system line to the spare system line or from the spare system line to the current system line;

a first selector for selecting the address value of each of cells on the current and spare system lines which are sequentially output from said buffer in accordance with the mark information from said VPI/mark control section;

an idle cell address block for holding address information incorporating a format of an empty cell;

a second selector for receiving an output from said idle cell address block and an output from said first selector, selecting one of the outputs on the basis of the mark information from said VPI/mark control section, and outputting the selected output to said common buffer memory; and a second VPI converter for receiving an output from said common buffer memory and outputting an ATM cell stream obtained by restoring the VPI values, which have been regularly converted by said first VPI converter, to the initial VPI values.

* * * * *